United States Patent
Ruf et al.

[11] Patent Number: 5,185,435
[45] Date of Patent: Feb. 9, 1993

[54] PROCESS FOR THE PREPARATION OF BISAZO PIGMENTS IN HALOGEN-FREE SOLVENTS

[75] Inventors: Klaus Ruf, Bollschweil, Fed. Rep. of Germany; Bilge Gülec, Basel, Switzerland; Michael Reisinger, Himmelried, Switzerland; Werner Surber, Oberwil, Switzerland

[73] Assignee: Ciba-Geigy Corporation, Ardsley, N.Y.

[21] Appl. No.: 828,334

[22] Filed: Jan. 30, 1992

[30] Foreign Application Priority Data

Feb. 7, 1991 [CH] Switzerland .................. 383/91
Feb. 7, 1991 [CH] Switzerland .................. 384/91

[51] Int. Cl.$^5$ .................. C09B 43/124; C09B 43/132; C09B 43/12
[52] U.S. Cl. .................. 534/591; 534/745; 534/748; 534/819; 534/828; 534/829; 534/830
[58] Field of Search .............. 534/591, 748, 745, 819, 534/830, 829, 828

[56] References Cited

U.S. PATENT DOCUMENTS

| | | | |
|---|---|---|---|
| 2,741,658 | 4/1956 | Schmid et al. | 534/591 X |
| 2,936,306 | 5/1960 | Schmid et al. | 534/748 X |
| 3,356,672 | 12/1967 | Schefczik et al. | 534/591 X |
| 3,684,792 | 8/1972 | Mueller | 534/591 X |
| 3,825,527 | 7/1974 | Ruider et al. | 534/591 X |
| 3,832,339 | 8/1974 | Stocker et al. | 534/591 X |
| 3,900,459 | 8/1975 | Kawamuro et al. | 260/157 |
| 3,941,768 | 3/1976 | Stocker | 260/184 |
| 4,719,293 | 1/1988 | Ronco | 534/828 |

FOREIGN PATENT DOCUMENTS

| | | | |
|---|---|---|---|
| 50-11411 | 5/1975 | Japan | 534/591 |
| 1342140 | 12/1973 | United Kingdom | 534/591 |
| 1466435 | 9/1974 | United Kingdom | 534/591 |

*Primary Examiner*—Floyd D. Higel
*Attorney, Agent, or Firm*—JoAnn Villamizar

[57] ABSTRACT

The present invention relates to the preparation of bisazo pigments by reaction (a) of 2 mol of an azocarbonyl chloride of the formula

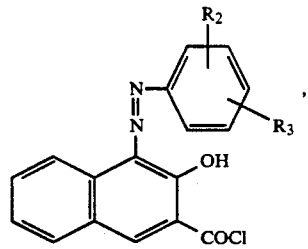

with 1 mol of a diamine of the formula

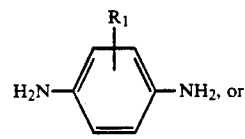

by reaction (b) of one mole of a bis(azocarbonyl chloride) of the formula

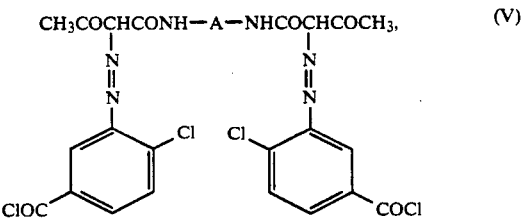

with 2 mol of an amine of the formula

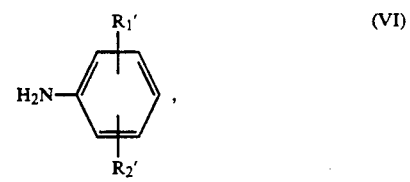

which comprises carrying out the reactions (a) or (b) in the presence of 1,2,3-trimethylbenzene or anisole as the solvent.

19 Claims, No Drawings

PROCESS FOR THE PREPARATION OF BISAZO PIGMENTS IN HALOGEN-FREE SOLVENTS

The present invention relates to a process for the preparation of bisazo pigments of the bis(hydroxynaphthoylamino)benzene or bis(acetoacetylamino)benzene series by methods known per se but using 1,2,3-trimethylbenzene or anisole as the solvent.

Bisazo pigments have been known for a long time and processes for their preparation using the customary condensations of acid chlorides with amines have been described in a large number of publications, for example in GB-A 1,466,435, in JP-A2-75/11411, in U.S. Pat. No. 2,936,306 and in U.S. Pat. No. 3,941,768. This condensation is preferably carried out in chlorinated solvents, in particular in o-dichlorobenzene, as is in general also done on a large industrial scale. However, in the abovementioned publications, it is pointed out and shown in individual examples that other solvents, including, for example, toluene and xylene, may also be suitable. However, in reality, it has never been possible to obtain with these unchlorinated solvents results which meet todays industrial requirements.

It has now been found that when 1,2,3-trimethylbenzene or anisole is used as the solvent, the abovementioned condensation reaction can surprisingly be carried out while maintaining the yield and quality of the products required.

Accordingly, the present invention relates to a process for the preparation of bisazo pigments selected from the bis(hydroxynaphthoylamino)benzene and bis(acetoacetylamino)benzene series by methods known per se, which process comprises using 1,2,3-trimethylbenzene or anisole as the solvent.

Of particular interest is a process for the preparation of bisazo pigments of the formula

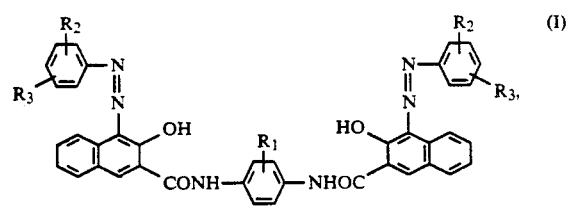

in which $R_1$ is hydrogen, chlorine or methyl and $R_2$ and $R_3$, independently of one another, are chlorine, methyl or nitro, by reaction (a) of 2 mol of an azocarbonyl chloride of the formula

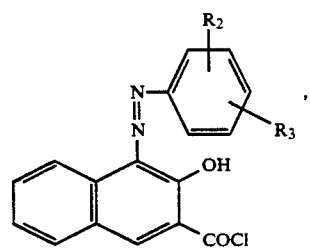

in which $R_2$ and $R_3$ are as defined above, with 1 mole of a diamine of the formula

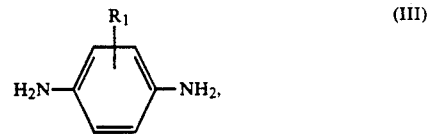

in which $R_1$ is as defined above, or of the formula

in which A is a group

in which $R'_1$ and $R'_2$, independently of one another, are chlorine, methyl, trifluoromethyl, unsubstituted or chlorine-, methyl- or methoxy-substituted phenoxy, and $R'_3$ and $R'_4$, independently of one another, are chlorine or methyl, by reaction (b) of one mole of a bis(azocarbonyl chloride) of the formula

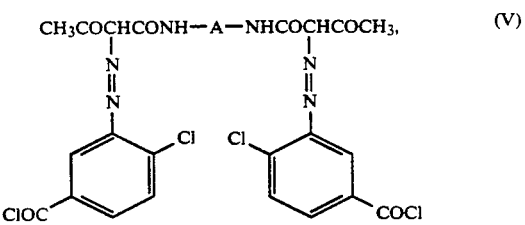

in which A is as defined above, with 2 mol of an amine of the formula

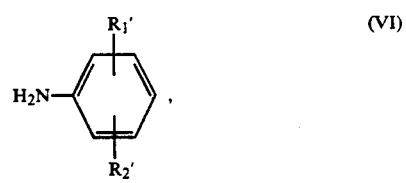

in which $R'_1$ and $R'_2$ are as defined above, which comprises carrying out the reactions (a) or (b) in the presence of 1,2,3-trimethylbenzene or anisole as the solvent.

Preferred azocarbonyl chlorides of the formula II are those of the formulae

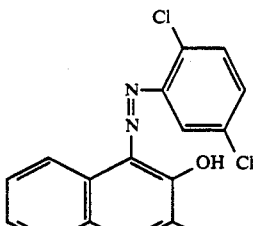

and

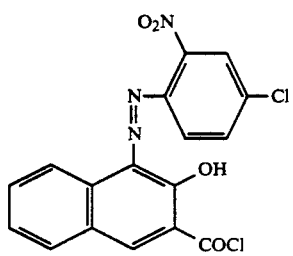

Preferred diamines of the formula III are p-phenylenediamine and 1,4-diamino-2-chlorobenzene.

Particular preference is given to the condensation of the azocarbonyl chloride of the formula VII with p-phenylenediamine or with 1,4-diamino-2-chlorobenzene or of the azocarboxamide of the formula VIII with 1,4-diamino-2-chlorobenzene.

Preferred bis(azocarbonyl chlorides) of the formula V are those in which A is one of the groups

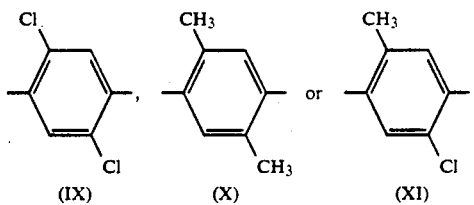

Preferred amines of the formula VI are those in which R'$_1$ and R'$_2$, independently of one another, are chlorine, methyl, trifluoromethyl or p-chlorophenoxy and in particular those of the formulae

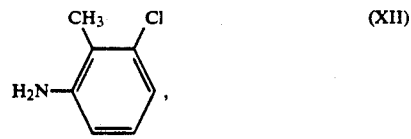

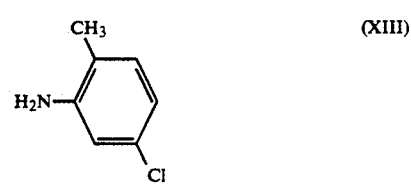

and

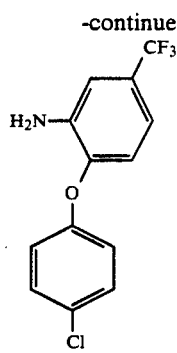

The following condensation reactions are very particularly preferred:

reaction of a bis(azocarbonyl chloride) of the formula V in which A is a group IX with an amine of the formula XIII;

reaction of a bis(azocarbonyl chloride) of the formula V in which A is a group X with an amine of the formula XIII;

reaction of a bis(azocarbonyl chloride) of the formula V in which A is a group XI with an amine of the formula XII or of the formula XIV.

The azocarbonyl chlorides of the formula II, the bis(azocarbonyl chlorides) of the formula V, the diamines of the formula III and the amines of the formula VI are known compounds.

Except for the use of 1,2,3-trimethylbenzene or of anisole, the condensation reactions are carried out by known and generally customary methods.

Reaction (a) is advantageously carried out at temperatures of between 80° and 160° C., preferably of between 135° and 145° C., for a duration of 2 to 6, preferably 3 to 5, hours, preferably using 1,2,3-trimethylbenzene.

Reaction (b) is advantageously carried out at temperatures of between 130° and 175° C., preferably of between 135° and 145° C. in the case of anisole and of between 150° and 165° C. in the case of 1,2,3-trimethylbenzene, for a duration of 8 to 20, preferably 12 to 17, hours, preferably using anisole.

Advantageously, 3 to 10 times, preferably 5 to 8 times, the amount by weight of 1,2,3-trimethylbenzene or anisole, relative to the azocarbonyl chloride of the formula II, is used in reaction (a), while, advantageously, 5 to 20 times, preferably 8 to 15 times, the amount by weight of 1,2,3-trimethylbenzene or anisole, relative to the bis(azocarbonyl chloride) of the formula V, is used in reaction (b).

The known, customary precursors for preparing the azocarbonyl chloride of the formula II or the bis(azocarbonyl chloride) of the formula V, i.e. diazotisation of the amine

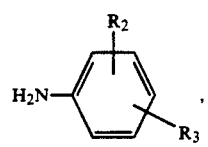

or of the amine

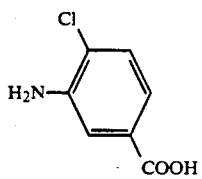

which is preferably carried out using an alkyl nitrite (and even the preparation of alkyl nitrite) the coupling onto the 2-hydroxy-3-naphthoic acid or onto the bis-(acetoacetylamino)benzene and the reaction of the acid with the chlorinating agent (preferably thionyl chloride) can also advantageously be carried out by replacing the customary solvents with 1,2,3-trimethylolbenzene or anisole. Advantageously, the alkyl nitrite formation (preferably isopropyl nitrite) is carried out at temperatures between −30° and 20° C., the azocarboxylic acid or bisazocarboxylic acid synthesis (coupling) is carried out between 40° and 60° C. and the chlorination of the acid between 80° and 140° C.

The examples which follow illustrate the invention.

EXAMPLE 1

88 g (1.46 mol) of isopropanol, 103.6 g (1.5 mol) of sodium nitrite, 100% pure, and 320 ml of 1,2,3-trimethylbenzene are initially introduced into a 1.5 liter sulfonating flask. After addition of 440 g of ice, the internal temperature drops to about −20° C. 142 ml (1.45 mol) of hydrochloric acid (32%) are added dropwise over a period of 15 minutes with stirring, and the mixture is stirred at −5° to 0° C. for another 15 minutes. After phase separation, the top phase (isopropyl nitrite dissolved in 1,2,3-trimethylbenzene) is separated off. The aqueous phase is extracted with another 100 ml of 1,2,3-trimethylbenzene. The combined organic phase is kept ready for the further reaction.

195.0 g (1.2 mol) of 2,5-dichloroaniline (100% pure), 230.0 g (1.222 mol) of 2-hydroxy-3-naphthoic acid and 2000 ml of 1,2,3-trimethylbenzene are intially introduced into a 3 liter sulfonating flask for the coupling reaction. After heating to 45° C. the above isopropyl nitrite solution is added dropwise to the thin, liquid yellow suspension at 45°–50° C. over a period of 30–60 minutes. After rinsing with a maximum of 500 ml of 1,2,3-trimethylbenzene, stirring of the dark, viscous suspension at 45°–50° C. is continued for 2 hours. Water/isopropanol and isopropyl nitrite are distilled off under vacuum (100 mbar) until, at about 100° C. (100 mbar), pure 1,2,3-trimethylbenzene distills off. After aeration of the apparatus and cooling to room temperature, the dark red reaction suspension is filtered. The filtered product is then washed with 1000 ml of 1,2,3-trimethylbenzene, giving about 600 g of azocarboxylic acid (30% 1,2,3-trimethylbenzene-moist).

72.2 g (0.2 mol) of azocarboxylic acid (100% pure) in 440 ml of 1,2,3-trimethylbenzene are initially introduced into a 1 liter sulfonating flask at 80° C. After addition of 0.4 ml of pyridine, 25.4 g (0.2132 mol) of thionyl chloride are added dropwise at 80°–85° C. over a period of 15 minutes, the mixture is heated to 115° C. and stirred at 115°–120° C. for one hour. At the same time, 14.3 g (0.1 mol) of 2-chloro-1,4-phenylenediamine (100% pure) in 200 ml of 1,2,3-trimethylbenzene are dissolved in a conical flask at 65° C. After cooling to 85° C., the solution is added in portions, the mixture is heated to 140° C. and stirring at this temperature is continued for 4 hours.

Finally, the pigment suspension, after cooling to 110° C. and addition of 15 ml of water, is brought to a pH of 5–6.5 with about 5 ml of 25–30% ammonia. The product is filtered off at 105°–110° C., washed with 950 ml of 1,2,3-trimethylbenzene, 1000 ml of isopropanol and then with 2–3 liters of water. The pigment is dried at 120° C. to constant weight, giving 75 g (0.09 mol; 90% of theory) of the pigment of the formula

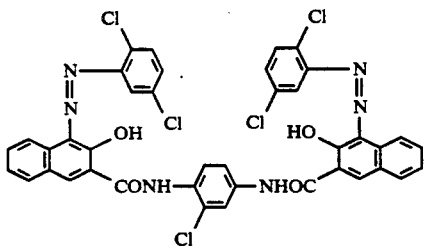

EXAMPLE 2:

14.8 g (0.246 mol) of isopropanol, 17.8 g (0.252 mol) of sodium nitrite and 70 g of 1,2,3-trimethylbenzene are initially introduced into a 0.35 liter sulfonating flask. After addition of 60 g of ice, the internal temperature drops to about −10° C. 27.7 g (0.243 mol) of hydrochloric acid (32%) are then added dropwise at this temperature over a period of 40 minutes with stirring, and the mixture is stirred for another 15 minutes. The organic phase of the reaction mixture (=isopropyl nitrite dissolved in 1,2,3-trimethylbenzene) is separated from the aqueous phase by means of a separating funnel.

230 g of 1,2,3-trimethylbenzene are initially introduced into a 1 liter ground glass joint flask, 35.6 g (0.216 mol) of 2,5-dichloroaniline are introduced with stirring and dissolved by heating to 40° C. 40.6 g (0.211 mol) of 2-hydroxy-3-naphthoic acid are introduced into this dark brown solution, followed by rinsing with 80 g of 1,2,3-trimethylbenzene. The isopropyl nitrite dissolved in 1,2,3-trimethylbenzene is then added dropwise. The mixture is heated to 50° C. and stirring is continued for 2 hours. A total of 30 g of solvent is then distilled off first at 50° C./130 mbar and then at 70° C./30 mbar. After aeration of the apparatus with nitrogen and cooling to room temperature, the dark red reaction suspension is filtered. The filter material (azocarboxylic acid) is then washed with 180 g of 1,2,3-trimethylbenzene and dried.

73.7 g (0.204 mol) of azocarboxylic acid and 0.3 g of benzyltriethylammonium chloride are suspended in 272 g of 1,2,3-trimethylbenzene in a 1 liter ground glass joint flask, and the slurry is heated to 80° C. with stirring. 25.6 g (0.213 mol) of thionyl chloride are then added dropwise over a period of 20 minutes, the mixture is heated to 115° C. and stirred for one hour. At the same time, 318 g of 1,2,3-trimethylbenzene are initially introduced into a 0.75 liter sulfonating flask, 10.6 g (0.0981 mol) of 1,4-phenylenediamine are introduced and dissolved by heating to 130° C. This solution is introduced in portions into the 1 liter ground glass joint flask over a period of 10 minutes, followed by rinsing with 36 g of hot 1,2,3-trimethylbenzene at 110° C. The mixture is heated to 140° C. with stirring and stirring is continued for 4 hours. Finally, the pigment suspension is neutralised by introducing a suspension of 6.5 g of sodium bicarbonate in 100 g of 1,2,3-trimethylbenzene, and the product is filtered off. It is washed with 890 g of hot 1,2,3-trimethylbenzene, 800 g of isopropanol and finally with 2000 g of water. The pigment is dried at 100° C. to constant weight, giving 72.6 g (0.0914 mol; 93.2% of theory) of the pigment of the formula

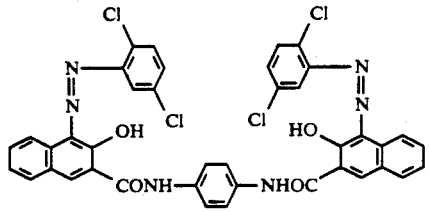

EXAMPLE 3:

17.4 g (0.29 mol) of isopropanol, 20.4 g (0.30 mol) of sodium nitrite, 100% pure, and 64 ml of anisole are initially introduced into a 1 liter ground glass joint flask. After addition of 110 g of ice, the internal temperature drops to about −11° C. 28 ml (0.29 mol) of hydrochloric acid (32%) are added dropwise over a period of 15 minutes with stirring, and stirring of the mixture at −5° to 0° C. is continued for 15 minutes. After phase separation, the top phase (isopropyl nitrite dissolved in anisole) is separated off. The aqueous phase is extracted with another 50 ml of anisole. The combined organic phase is kept ready for the further reaction.

42.6 g (0.24 mol) of 4-chloro-2-nitroaniline (98% pure), 46.2 g (0.25 mol) of 2-hydroxy-3-naphthoic acid and 330 ml of anisole are initially introduced into a 1 liter ground glass joint flask for the coupling reaction. After heating to 45° C., the above isopropyl nitrite solution is added dropwise to the thin, liquid yellow suspension at 45°-50° C. over a period of 30-60 minutes. Stirring of the dark, viscous suspension at 45°-50° C. is continued for 2 hours. 120 ml of a mixture of water/isopropanol/isopropyl nitrite/anisole is distilled off under vacuum (40 mbar) up to about 61° C. After aeration of the apparatus, the dark red reaction suspension is cooled to room temperature, 1 g of benzyltriethylammonium chloride is added, and the mixture is heated to 85° C. 30.8 g (0.26 mol) of thionyl chloride are then added dropwise at 80°-85° C. over a period of 15 minutes, the mixture is heated to 115° C. and stirred at 115°-120° C. for one hour. After cooling to room temperature, the dark red reaction suspension is filtered. The filtered material is then washed with 220 ml of anisole.

The filter cake obtained is initially introduced into a 1 liter ground glass joint flask together with 380 ml of anisole, 0.7 g of benzyltriethylammonium chloride and 1 ml of thionyl chloride, and the mixture is heated to 100° C. At the same time, 14.8 g (0.10 mol) of 2-chloro-1,4-phenylenediamine (99% pure) are dissolved in 130 ml of anisole at 110° C. in a conical flask. This solution is introduced in portions into the ground glass joint flask over a period of 10 minutes. The mixture is heated to 140° C. with stirring and stirred for 4 hours.

The pigment suspension is diluted with 230 ml of anisole and cooled to 100° C. The reaction mixture is brought to a pH of 5-6.5 with about 5.0 g of sodium bicarbonate. The product is filtered off at 95°-100° C. and washed with 1700 ml of hot anisole, 1000 ml of isopropanol and then with 3000 ml of water. The pigment is dried at 120° C. to constant weight, giving 82.3 g (0.097 mol, 80% of theory) of pigment of the formula

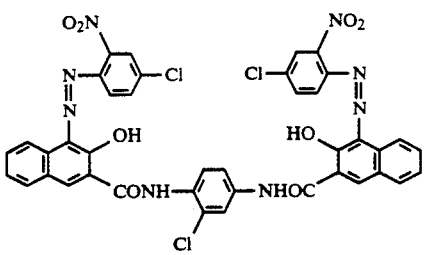

EXAMPLE 4

420.0 g of anisole are initially introduced at room temperature into a 0.75 liter sulfonating flask. 51.7 g of the bis(azocarboxylic acid) of the formula

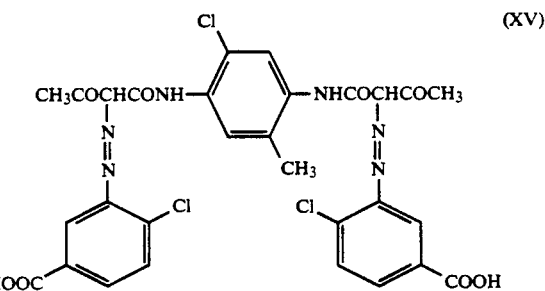

(XV)

and 1.2 g of dimethylformamide are added with stirring. The mixture is then heated to 80°-85° C. As soon as the internal temperature has reached 80° C., 39.5 g of thionyl chloride are added dropwise over a period of 10 minutes. This produces equimolar amounts of $SO_2$ and HCl, which are disposed of via a gas absorption apparatus. After the dropwise addition of thionyl chloride, the reaction suspension is heated to 110°-115° C. and stirred at this temperature for 3 hours, resulting in the desired bis(azocarbonyl chloride).

The reaction suspension is then cooled to 50° C., the product is filtered off at this temperature and washed with 535.0 g of anisole until the runoff is colourless and acid-free. The yield of moist bis(azocarbonyl chloride) is 131.0 g.

480.0 g of anisole are initially introduced at room temperature into a 1.5 liter ground glass joint flask. 131.0 g of the moist bis(azocarbonyl chloride) are added with stirring, the mixture is heated to 80°-85° C., and 21.9 g of 2-amino-6-chlorotoluene dissolved in 100.0 g of anisole are added dropwise at this temperature over a period of 15 minutes. The reaction suspension is then heated to 140° C. and stirred at this temperature for 15 hours.

The pigment suspension is then cooled to 50° C., and 476.0 g of methanol are added at such a rate that the internal temperature remains at 50° C. The pH is then brought to 8.0-8.5 by adding 4.3 g of sodium methoxide (30% in methanol) and the mixture is stirred at this temperature for 1 hour. The pigment is filtered off at this temperature, washed with 369.0 g of methanol until the runoff is colourless and with 500.0 g of water until it is free of salt and dried in a vacuum drying cabinet at 120° C. to a moisture content of <1%.

Yield: about 63.0 g (89.6% of theory) of the pigment of the formula

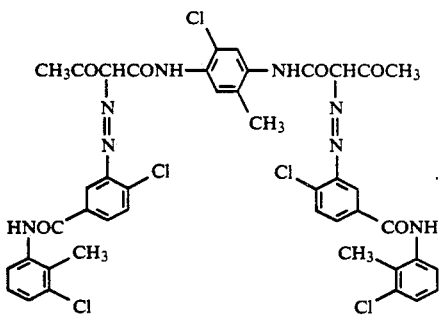

EXAMPLE 5

374.0 g of 1,2,3-trimethylbenzene are initially introduced at room temperature into a 0.75 liter sulfonating flask. 51.7 g of the bis(azocarboxylic acid) of the formula XV (as in Example 4) and 1.2 g of dimethylformamide are added with stirring. The mixture is then heated to 80°–85° C. As soon as the internal temperature has reached 80° C., 39.5 g of thionyl chloride are added dropwise over a period of 10 minutes. This results in equimolar amounts of $SO_2$ and HCl, which are disposed of via gas absorption apparatus. After the dropwise addition of the thionyl chloride, the reaction suspension is heated to 130°–135° C. and stirred at this temperature for 3 hours, resulting in the desired bis(azocarbonyl chloride).

The reaction suspension is then cooled to 50° C., the product is filtered off at this temperature and washed with 406.0 g of 1,2,3-trimethylbenzene until the runoff has become colourless and free of acid. The yield of moist bis(azocarbonyl chloride) is 131.0 g.

574.0 g of 1,2,3-trimethylbenzene are initially introduced at room temperature into a 1.5 liter ground glass joint flask. 131.0 g of the moist bis(azocarbonyl chloride) are added with stirring, the mixture is heated to 80°–85° C., and 21.9 g of 2-amino-6-chlorotoluene dissolved in 95.0 g of 1,2,3-trimethylbenzene are added dropwise at this temperature over a period of 15 minutes. The reaction suspension is then heated to 160° C. and stirred at this temperature for 15 hours.

The pigment suspension is then cooled to 50° C., and 476.0 g of methanol are added at such a rate that the internal temperature remains at 50° C. The pH is then brought to 8.0–8.5 by adding 9.4 g of sodium methoxide (30% in methanol), and the mixture is stirred at this temperature for 1 hour. The pigment is filtered off at this temperature, washed with 399.0 g of methanol until the runoff has become colourless and with 500.0 g of water until it is free of salt and dried in a vacuum drying cabinet at 120° C. to a moisture content of <1%.

Yield: about 64.0 g (91.0% of theory) of the pigment of the formula XVI (as in Example 4).

What is claimed is:

1. A process for the preparation of bisazo pigments of the formula

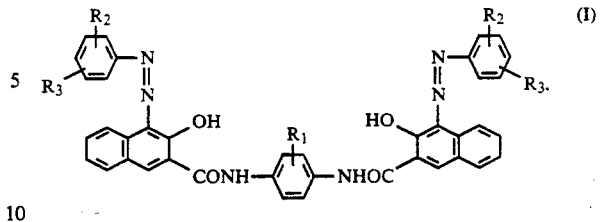

in which $R_1$ is hydrogen, chlorine or methyl and $R_2$ and $R_3$, independently of one another, are chlorine, methyl or nitro, by reaction (A) of 2 mol of an azocarbonyl chloride of the formula

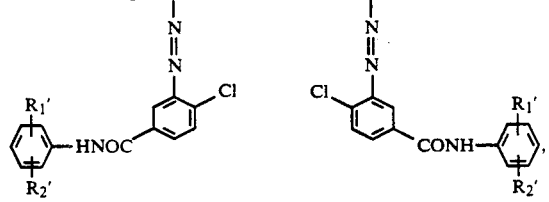

in which $R_2$ and $R_3$ are as defined above, with 1 mol of a diamine of the formula

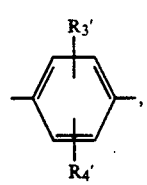

in which $R_1$ is as defined above, or of the formula $$CH_3COCHCONH-A-NHCOCHCOCH_3 \quad (IV)$$

(structure with azo groups, Cl substituents, and $R_1'$, $R_2'$ groups)

in which A is a group (phenylene group with $R_3'$, $R_4'$ substituents)

in which $R'_1$ and $R'_2$, independently of one another, are chlorine, methyl, trifluoromethyl, unsubstituted or chlorine-, methyl- or methoxy-substituted phenoxy, and $R'_3$ and $R'_4$, independently of one another, are chlorine or methyl, by reaction (b) of one mole of a bis(azocarbonyl chloride) of the formula of a bis(azocarbonyl chloride) of the formula

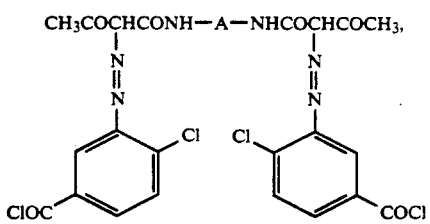

in which A is as defined above, with 2 mol of an amine of the formula

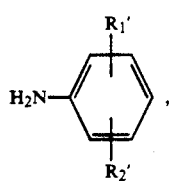

in which $R'_1$ and $R'_2$ are as defined above, which comprises carrying out the reactions (a) or (b) in the presence of 1,2,3-trimethylbenzene or anisole as the solvent.

2. A process according to claim 1 for the preparation of bisazo pigments of the formula

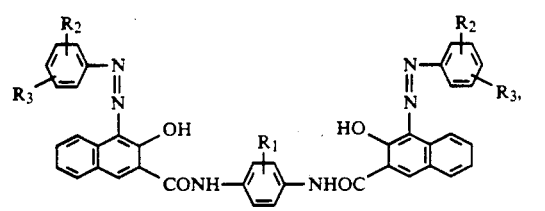

in which $R_1$ is hydrogen, chlorine or methyl and $R_2$ and $R_3$, independently of one another, are chlorine, methyl or nitro, by reaction of 2 mol of an azocarbonyl chloride of the formula

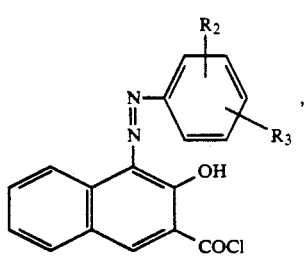

in which $R_2$ and $R_3$ are as defined above, with 1 mol of a diamine of the formula

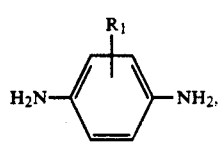

in which $R_1$ is as defined above.

3. A process according to claim 2, wherein the starting material is one of the azocarbonyl chlorides of the formulae

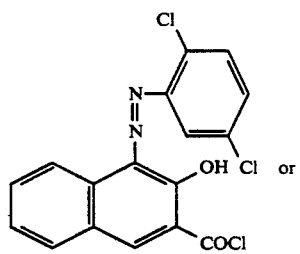

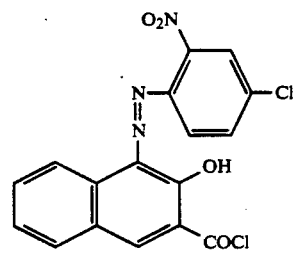

4. A process according to claim 2, wherein p-phenylenediamine or 1,4-diamino-2-chlorobenzene is used as the diamine.

5. A process according to claim 2, wherein the azocarbonyl chloride of the formula

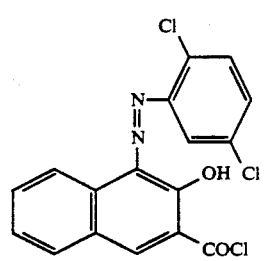

is condensed with p-phenylenediamine or with 1,4-diamino-2-chlorobenzene.

6. A process according to claim 2, wherein the azocarbonyl chloride of the formula

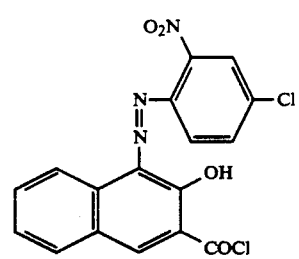

is condensed with 1,4-diamino-2-chlorobenzene.

7. A process according to claim 2, wherein 1,2,3-trimethylbenzene is used as the solvent.

8. A process according to claim 3, wherein the condensation is carried out at a temperature of between 80° and 160° C.

9. A process according to claim 2, wherein 3 to 10 times the amount by weight of 1,2,3-trimethylbenzene or anisole, relative to the azocarbonyl chloride, is used.

10. A process according to claim 1 for the preparation of bisazo pigments of the formula

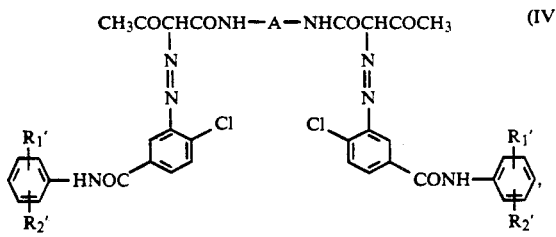 (IV)

in which A is a group

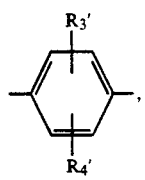, in which $R'_1$ and $R'_2$, independently of one another, are chlorine, methyl, trifluoromethyl, unsubstituted or chlorine-, methyl- or methoxy-substituted phenoxy, and $R'_3$ and $R'_4$, independently of one another, are chlorine or methyl, by reaction of one mol of a bis(azocarbonyl chloride) of the formula

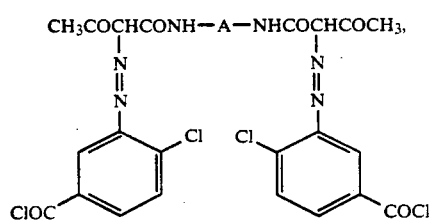 (V)

in which A is as defined above, with 2 mol of an amine of the formula

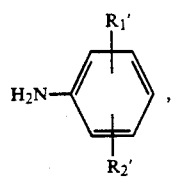 (VI)

in which $R'_1$ and $R'_2$ are as defined above.

11. A process according to claim 10, wherein the starting material is a bis(azocarbonyl chloride) of the formula V in which A is one of the groups

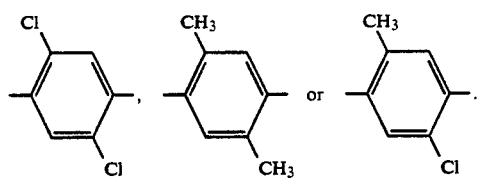

12. A process according to claim 10, wherein an amine of the formula VI is used in which $R'_1$ and $R'_2$, independently of one another, are chlorine, methyl, trifluoromethyl or p-chlorophenoxy.

13. A process according to claim 12, wherein an amine of the formula

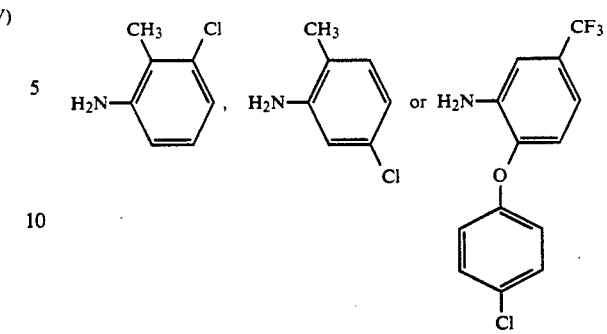

is used.

14. A process according to claim 10, wherein a bis-(azocarbonyl chloride) of the formula V in which A is a group

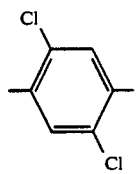

is condensed with an amine of the formula

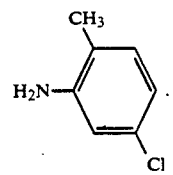.

15. A process according to claim 10, wherein a bis-(azo-carbonyl chloride) of the formula V in which A is a group

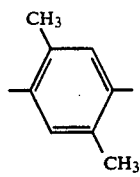

is condensed with an amine of the formula

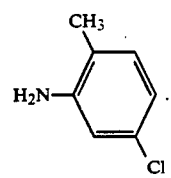

16. A process according to claim 10, wherein a bis-(azocarbonyl chloride) of the formula V in which A is a group

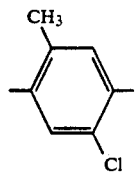

is condensed with an amine of the formula

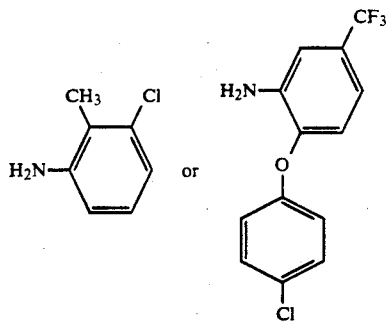

17. A process according to claim 10, wherein the condensation is carried out at a temperature of between 150° and 165° C. using 1,2,3-trimethylbenzene as the solvent.

18. A process according to claim 10, wherein the condensation is carried out at a temperature of between 135° and 145° C. using anisole as the solvent.

19. A process according to claim 10, wherein 8 to 15 times the amount by weight of 1,2,3-trimethylbenzene or anisole, relative to the bis(azocarbonyl chloride), is used.

* * * * *